United States Patent [19]
Wünsch et al.

[11] Patent Number: 6,162,866
[45] Date of Patent: Dec. 19, 2000

[54] THERMOPLASTIC MOLDING COMPOSITIONS BASED ON STAR POLYMERS WITH THERMOPLASTIC ELASTOMERS AND POLYARYLENE ETHERS

[75] Inventors: Josef Wünsch, Schifferstadt; Konrad Knoll, Ludwigshafen; Hermann Gausepohl, Mutterstadt, all of Germany

[73] Assignee: BASF Aktiengesellschaft, Ludwigshafen, Germany

[21] Appl. No.: 09/372,809

[22] Filed: Aug. 12, 1999

[30] Foreign Application Priority Data

Aug. 13, 1998 [DE] Germany .......................... 198 36 410

[51] Int. Cl.[7] .............................. C08L 53/00; C08L 51/00
[52] U.S. Cl. ................................ 525/68; 525/63; 525/69; 525/71; 525/92 D; 525/93
[58] Field of Search .................. 525/69, 68, 63, 525/71, 92 D, 93

[56] References Cited

U.S. PATENT DOCUMENTS 5,854,353  12/1998  Knoll et al. ............................ 525/314

FOREIGN PATENT DOCUMENTS

| 546497 | 6/1993 | European Pat. Off. . |
| 780412 | 6/1997 | European Pat. Off. . |
| 19700306 | 7/1998 | Germany . |
| 94/24206 | 10/1994 | WIPO . |
| 97/34936 | 9/1997 | WIPO . |
| 98/08881 | 3/1998 | WIPO . |

OTHER PUBLICATIONS

Trepka, W. J., "Synthesis and Properties of Block Copolymers of 1, 1–Diphenylethylene/Styrene and Butadiene," J. Polymer Sci., Part B, vol. 8(7), Jul. 1970 pp. 499–504.

Derwent WPI Abstract, EP 780412 A1, Jun. 1997.

Derwent WPI Abstract, WO 9808881 A1, Mar. 1998.

*Primary Examiner*—Tae Yoon
*Attorney, Agent, or Firm*—Keil & Weinkauf

[57] ABSTRACT

Thermoplastic molding compositions comprise:

| A) from 20 to 96% | by weight of star polymers obtainable by polymerizing vinylaromatic monomers with a branched monomer building block which contains at least two vinylaromatic functions, |
| B) from 3 to 50% | by weight of copolymers comprising vinylaromatic monomers, 1,1-diphenylethylene and, if desired, dienes, |
| C) from 1 to 15% | by weight of polyarylene ethers, |
| D) from 0 to 5% | by weight of nucleating agents, |
| E) from 0 to 5% | by weight of antioxidants, |
| F) from 0 to 5% and | by weight of stabilizers, |
| G) from 0 to 50% | by weight of fibrous or particulate fillers. |

15 Claims, No Drawings

THERMOPLASTIC MOLDING COMPOSITIONS BASED ON STAR POLYMERS WITH THERMOPLASTIC ELASTOMERS AND POLYARYLENE ETHERS

The present invention relates to thermoplastic molding compositions comprising:

| | |
|---|---|
| A) from 20 to 96% | by weight of star polymers obtainable by polymerizing vinylaromatic monomers with a branched monomer building block which contains at least two vinylaromatic functions, |
| B) from 3 to 50% | by weight of copolymers comprising vinylaromatic monomers, 1,1-diphenylethylene and, if desired, dienes, |
| C) from 1 to 15% | by weight of polyarylene ethers, |
| D) from 0 to 5% | by weight of nucleating agents, |
| E) from 0 to 5% | by weight of antioxidants, |
| F) from 0 to 5% | by weight of stabilizers, and |
| G) from 0 to 50% | by weight of fibrous or particulate fillers. |

The present invention also relates to a process for preparing the thermoplastic molding compositions, their use to produce fibers, films or moldings, and also the resultant fibers, films and moldings.

EP-A 546 497 describes compositions made from syndiotactic polystyrene with inorganic filler, modified polyphenylene ether and rubber. These compositions do not have sufficient heat resistance and impact strength for many applications.

WO 94/24206 discloses compositions made from syndiotactic polystyrene with certain rubbers, nucleating agent, reinforcing agent and polyphenylene ether. Here, too, heat resistance and impact strength are unsatisfactory.

It is an object of the present invention to provide thermoplastic molding compositions which have effective modification with good heat resistance and impact strength.

We have found that this object is achieved by means of the thermoplastic molding compositions defined at the outset.

A process for preparing the thermoplastic molding compositions has been found, as have the use of the compositions for producing fibers, films or moldings, and also the resultant fibers, films and moldings.

As component A), the novel thermoplastic molding compositions comprise from 20 to 96% by weight, preferably from 30 to 94% by weight, in particular from 40 to 92% by weight, of a star polymer which is obtainable by polymerizing vinylaromatic monomers with a branched monomer building block which contains at least two vinylaromatic functions.

These star polymers A) are preferably prepared in the presence of a catalyst system whose active constituents are a transition metal complex of the 2nd to 8th transition group of the Periodic Table, preferably of the 3rd to 8th transition group, in particular of the 4th transition group, i.e. titanium, zirconium or hafnium, a metallocenium-ion-forming compound, such as an open-chain or cyclic aluminoxane compound, a strong, neutral Lewis acid, an ionic compound with Lewis acid cations or an ionic compound with a Bronsted acid as cation, and, if desired, an aluminum compound, such as a trialkylaluminum compound or a dialkylaluminum hydride.

Preferred branched monomeric building blocks are compounds of formula (I):

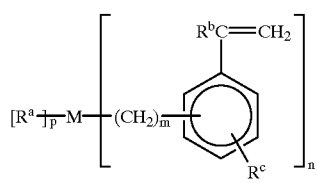

where:

$R^a$ is hydrogen, halogen or an inert organic radical having up to 20 carbon atoms, and if $p \geq 2$ the radicals $R^a$ may be identical or different, and two radicals $R^a$ may, together with the metal atom bonded thereto, form a from 3- to 8-membered ring, and $R^a$ may moreover be a conventional complex ligand, if M is a transition metal, $R^b$ is hydrogen, $C_1$–$C_4$-alkyl or phenyl;

$R^c$ is hydrogen, $C_1$–$C_4$-alkyl, phenyl, chlorine or an unsaturated hydrocarbon radical having from 2 to 6 carbon atoms, M is C, Si, Ge, Sn, B, Al, Ga, N, P, Sb, Ti, Zr, Hf, V, Nb, Ta, Cr, Mo, W, Mn, Fe, Ru, Os, Co, Rh, Ir, Ni, Pd, Pt, Cu, Zn, Cd, n is from 2 to 6, m is from 0 to 20, and p is from 0 to 4, with the proviso that the total of n and p equals the valency of M.

Particularly preferred branched monomeric building blocks of formula (I) are those where M is carbon, silicon, germanium, tin or titanium, since these are easily accessible. m is preferably from 0 to 8, particularly preferably from 0 to 4.

Preference is also given to titanium-containing monomers of formula Ia:

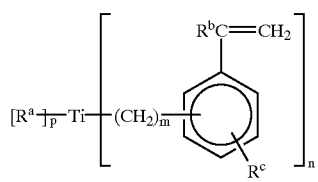

and in particular to the titanium compound Ib:

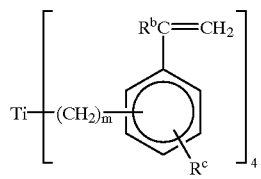

where $R^a$, $R^b$ and $R^c$ and also m, n and p, are as defined above.

Particularly suitable vinylaromatic compounds have the formula II:

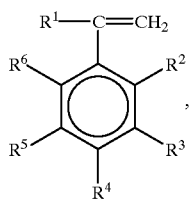

(II)

where:

R$^1$ is hydrogen or C$_1$–C$_4$-alkyl,

R$^2$ to R$^6$, independently of one another, are hydrogen, C$_1$–C$_{12}$-alkyl, C$_6$–C$_{18}$-aryl or halogen, or where two adjacent radicals jointly are cyclic groups having from 4 to 15 carbon atoms.

Preference is given to the use of vinylaromatic compounds of formula II where

R$^1$ is hydrogen and

R$^2$ to R$^6$ are hydrogen, C$_1$–C$_4$-alkyl, chlorine or phenyl, or where two adjacent radicals jointly are a cyclic group having from 4 to 12 carbon atoms, the resultant compounds of formula II being, for example, naphthalene derivatives or anthracene derivatives.

Examples of preferred compounds of this type are: styrene, p-methylstyrene, p-chlorostyrene, 2,4-dimethylstyrene, 4-vinylbiphenyl, 2-vinylnaphthalene and 9-vinylanthracene.

It is also possible to use mixtures of different vinylaromatic compounds, where one component may also have other hydrocarbon radicals, such as vinyl, allyl, methallyl, butenyl or pentenyl groups, preferably vinyl groups, on the phenyl ring. However, preference is given to the use of just one vinylaromatic compound.

Particularly preferred vinylaromatic compounds are styrene and p-methylstyrene.

Further details concerning the star polymers A), and also processes for their preparation, are found, for example, in WO 98/08881.

The novel thermoplastic compositions comprise, as component B), from 3 to 50% by weight, preferably from 3.5 to 40% by weight, in particular from 4 to 30% by weight, of copolymers made from vinylaromatic monomers with 1,1-diphenylethylene and, if desired, with dienes. This component B) may also be termed a thermoplastic elastomer (TPE).

Component B) is preferably prepared by anionic polymerization.

Particularly preferred components B) are three-block copolymers, in particular those which have been hydrogenated. The copolymers preferred for use as component B) are those which are prepared from styrene, 1,1-diphenylethylene and butadiene, in particular the styrene (S)/1,1-diphenylethylene (DPE)-butadiene-S/DPE-three-block copolymers where the butadiene block has been hydrogenated (EB), i.e. S/DPE-EB-S/DPE.

Other suitable copolymers or block copolymers are those with at least one block A made from vinylaromatic monomers a1) and 1,1-diphenylethylene or its derivatives a2) substituted on the aromatic rings if desired with alkyl having up to 22 carbon atoms, obtainable by anionic polymerization and using, to form the copolymer or the block A, an initiator solution composed of the reaction product of an anionic polymerization initiator and at least the equimolar amount of monomers a2).

Preference is given to the preparation, by sequential anionic polymerization, of block copolymers with at least one block A and at least one, hydrogenated or unhydrogenated, block B made from dienes B), where the following steps are carried out in sequence:

I) forming a block A by

I.1) preparing an initiator solution composed of the reaction product of an anionic polymerization initiator and at least the equimolar amount of monomers a2), I.2) adding any remaining amount of monomers a2) and from 60 to 100% of the total amount of monomers a1), I.3) adding any remaining amount of monomers a1) after at least 80% of the monomers added in the preceding steps have reacted, where the concentration of the polymerization solution after the last addition of monomer is at least 35% by weight, II) then forming a block B by II.1) adding an additive which affects the polymerization parameters, II.2) adding the dienes b), and if desired, the following steps:

III) adding a chain terminator or coupling agent,

IV) hydrogenating the block copolymer,

V) isolating and working-up the block copolymers by a method known per se, and

VI) adding stabilizers.

The copolymers or the blocks A are composed of vinylaromatic monomers a1) and 1,1-diphenylethylene or its derivatives a2) substituted on the aromatic rings if desired with alkyl groups having up to 22 carbon atoms, preferably having from 1 to 4 carbon atoms, for example methyl, ethyl, isopropyl, n-propyl, n-butyl, isobutyl or tert-butyl. Preferred vinylaromatic monomers a1) are styrene and its derivatives substituted in the α position or on the aromatic ring by from 1 to 4 carbon atoms, for example α-methylstyrene, p-methylstyrene, ethylstyrene, tert-butylstyrene or vinyltoluene. A particularly preferred monomer a2) is unsubstituted 1,1-diphenylethylene itself. The molar ratio of the units deriving from 1,1-diphenylethylene or its derivatives a2) to units deriving from vinylaromatic monomer a1) is generally from 1:1 to 1:25, preferably from 1:1.05 to 1:10 and particularly preferably from 1:1.1 to 1:3.

The copolymers or the blocks A preferably have random structure and a molecular weight Mw of generally from 1000 to 500,000, preferably from 3000 to 100,000, particularly preferably from 4000 to 30,000.

Suitable dienes b) for the block B are in principle any dienes, but preferably those having conjugated double bonds, for example 1,3-butadiene, isoprene, 2,3-dimethylbutadiene, 1,3-pentadiene, 1,3-hexadienes, phenylbutadiene, piperylene or mixtures of these. Particular preference is given to 1,3-butadiene and isoprene. The diene block may be partially or fully hydrogenated, or unhydrogenated. Hydrogenating polyisoprene blocks in this way gives ethylene-propylene blocks. Correspondingly, hydrogenating polybutadiene blocks gives polyethylene blocks or polyethylene-butylene blocks, depending on the 1,2-vinyl fraction in the unhydrogenated butadiene block. The hydrogenation makes the block copolymers more thermally stable and especially more resistant to ageing and weathering. The molecular weights Mw of the block B are generally from 10,000 to 500,000, preferably from 20,000 to 350,000 and particularly preferably from 20,000 to 200,000. The glass transition temperatures of the block B are generally below −30° C., preferably below −50° C.

The proportion by weight of the total of all of the blocks A, based on the total block copolymer, is generally from 5 to 95% by weight, preferably from 5 to 50% by weight, particularly preferably from 25 to 35% by weight.

The anionic polymerization is initiated by organometallic compounds. The initiator used may be the usual alkali metal alkyl compounds or alkali metal aryl compounds. It is useful to use organolithium compounds, such as ethyl-, propyl , isopropyl-, n-butyl-, sec-butyl-, tert-butyl-, phenyl-, hexyldiphenyl-, hexamethylenedi-, butadienyl-, isoprenyl- or polystyryllithium. Particular preference is given to 1,1-diphenylhexyllithium, which is readily obtainable from the reaction of 1,1-diphenylethylene with n- or sec-butyllithium. The amount of initiator required is calculated from the desired molecular weight and is generally from 0.002 to 5 mol %, based on the amount of monomers to be polymerized.

Suitable solvents are those inert to the organometallic initiator. Useful solvents are aliphatic, cycloaliphatic or aromatic hydrocarbons having from 4 to 12 carbon atoms, for example pentane, hexane, heptane, cyclopentane, cyclohexane, methylcyclohexane, decalin, isooctane, benzene, alkylbenzenes, such as toluene, xylene and ethylbenzene, and suitable mixtures.

Once the molecular weight has been built up, the "living" ends of the polymer may, if desired, be reacted with conventional chain terminators or coupling agents in amounts which usually depend on the amount of initiator used.

Suitable chain terminators are protonating substances or Lewis acids, for example water, alcohols, aliphatic or aromatic carboxylic acids, or also inorganic acids, such as carbonic acid, phosphoric acid or boric acid.

For coupling of the block copolymers use may be made of bi- or multifunctional compounds, such as halides of aliphatic or araliphatic hydrocarbons, for example 1,2-dibromoethane, bischloromethylbenzene, silicon tetrachloride, dialkyl- or diarylsilicon dichloride, alkyl- or arylsilicon trichloride, tin tetrachloride, polyfunctional aldehydes, such as terephthaldehyde, ketones, esters, anhydrides or epoxides. If the block copolymer is not hydrogenated, preferred coupling agents are carboxylic esters, such as ethyl acetate. For hydrogenated block copolymers the use of 1,2-dibromomethane or diepoxides is preferred, in particular diglycidyl ethers, such as 1,4-butanediol diglycidyl ether.

Lewis bases, such as polar, aprotic solvents, or metal salts soluble in hydrocarbons, for example, may be used as an additive (randomizer) which affects the polymerization parameters. Examples of Lewis bases which may be used are dimethyl ether, diethyl ether, ethylene glycol dimethyl ether, diethylene glycol dimethyl ether, tetrahydrofuran, tetrahydrofurfuryl ethers, such as tetrahydrofurfuryl methyl ether, and tertiary amines, such as pyridine, trimethylamine, triethylamine and tributylamine, and peralkylated bi- or oligoamines, such as tetramethylethylenediamine. The concentrations of these usually used are from 0.1 to 5 volume percent, based on the solvent. Among the metal salts soluble in hydrocarbons, use is preferably made of alkali-metal or alkaline-earth-metal salts of primary, secondary or especially tertiary alcohols, particularly preferably the potassium salts, such as potassium triethylcarbinolate or potassium tetrahydrolinaloolate. The molar ratio of metal salt to initiator is usually from 1:5 to 1:200, preferably from 1:30 to 1:100.

The nature and amount of randomizer used are selected depending on the final product desired. For polymers not intended for hydrogenation and if, for example butadiene is used and a high 1,4-vinyl fraction is desired, use of a potassium salt soluble in hydrocarbons is preferred. For polymers which are subsequently to be hydrogenated the use of tetrahydrofuran is preferred. The amount here is selected in such a way that, for example when butadiene is used, the resultant 1,2-vinyl content is from about 20 to 50%.

For this process it is preferable to take the entire amount of the monomers a2) in a solvent and add the polymerization initiator. However, it is also possible for some part of the monomers a2) or of the solvent not to be added until a later juncture. The amount of polymerization initiator is calculated from any protic contamination which may be present in monomers and solvent and which can be removed by titrating to the end point, and adding the amount calculated from the desired molecular weight and the total amount of monomer to be polymerized. Use is preferably made of n- or sec-butyllithium, which generally reacts completely with the monomers a2) to give 1,1-diphenylhexyllithium or, respectively, the corresponding substituted derivatives, in a few hours, generally in from 0.5 to 40 hours, and at from 20 to 70° C. From 60 to 100%, preferably from 70 to 90%, of the total amount of monomers a1) required to form the block A are metered into the initial charge, preferably held at a temperature of from 40 to 70° C. The feed time depends on the reactivity of the monomers used and on the concentration, and is generally from 0.5 to 10 hours at from 40 to 70° C. Addition of the remaining amount of the monomers a1) generally takes place after more than 80%, preferably more than 95%, of the monomers in the initial charge or added before this juncture have reacted. The block A is polymerized at high monomer concentration, allowing the amount of residual monomers a2) to be reduced. The concentration of the polymerization solution after the last addition of monomer is generally at least 35% by weight, particularly preferably more than 50% by weight.

To prepare the block copolymers having at least one block B, a block A is firstly formed as described above, and a block B is then formed by sequential anionic polymerization.

After the block A has been formed and prior to addition of the dienes b) the additive which affects the polymerization parameters is added to the polymerization solution. Block B is then polymerized by adding the dienes b). Prior to or during the addition of the diene it is advisable to dilute the reaction mixture with an inert solvent to ensure sufficient mixing and dissipation of heat. The polymerization temperature for the block B is preferably from 50 to 90° C., and if polar, aprotic solvents are used as randomizers it is particularly preferably from 50 to 70° C.

The resultant A-B block copolymers may be terminated via chain terminators or coupling agents, and/or if bifunctional coupling agents are used, linked to give linear three-block copolymers, or, if coupling agents of higher functionality are used, linked to give star-shaped block copolymers.

The process is not restricted to solution polymerization. For example, the process can also be readily applied to dispersion polymerization. For this it is advantageous to use a dispersion medium which is inert to the anionic polymerization initiators and in which the block A does not dissolve, for example propane, butane, isobutane, pentane or its branched isomers, hexane, heptane, octane or isooctane. To obtain a small particle size, from 0.1 to 2% by weight of a dispersant is usually added. Examples of suitable dispersants are styrene-butadiene two-block copolymers whose molar mass is as high as possible, for example above 100,000 g/mol.

The block copolymers may then be hydrogenated by the methods commonly used. The hydrogenation of the block copolymers may take place using the usual and well known rules for, on the one hand, reactions on polymers, and, on the other hand, hydrogenating olefinic double bonds. Catalysts suitable for this comprise metals of the iron group, in particular nickel and cobalt in combination with suitable reducing agents, such as alkylaluminum compounds.

For example, a solution of the hydrogenation catalyst is readily prepared as follows: A 20% strength solution of triisobutylaluminum in hexane is added at room temperature to a 1% strength solution of nickel acetylacetonate in toluene. The weight ratio of nickel acetylacetonate to triisobutylaluminum is in the region of 1:4. After the weakly exothermic reaction has concluded, the fresh catalyst solution is added to the polymer solution and brought into contact with hydrogen. 1.5 g (0.15% by weight) of nickel acetylacetonate per kg of polymer are sufficient. If the reaction mixture is particularly pure as little as 0.15 g is sufficient. The rate of hydrogenation achievable depends on the catalyst concentration, the hydrogen pressure and the reaction temperature. A degree of hydrogenation of more than 95% is achieved at 15 bar partial pressure of hydrogen, at from 180 to 200° C., after as little as from 30 to 120 minutes. At around 120° C. the hydrogenation takes from 8 to 16 ours. For a good space-time yield to be achieved, the hydrogen gas must be effectively mixed into the reaction mixture. This requires an effective stirrer with good vertical mixing which also creates sufficient interface to allow the gas to enter the solution. Those known as gassing stirrers are particularly suitable for this. Once the hydrogenation is complete, the colloidal nickel which colors the polymer solution black can be oxidized using a hydrogen peroxide-acetic acid mixture, eliminating the color.

Especially on an industrial scale, the hydrogenation may, of course, also be carried out using other homogeneous or heterogeneous hydrogenation catalysts. Hydrogenation on a fixed-bed catalyst is of particular interest, since this avoids contamination of the polymer by catalyst residues.

The polymer solution is worked up by conventional polymer technology methods, for example by degassing in the extruders or precipitating using polar solvents, such as alcohols, or by dispersing in water and removing the solvent by stripping.

As component C), the novel thermoplastic molding compositions comprise from 1 to 15% by weight, preferably from 2 to 10% by weight, in particular from 2.5 to 5% by weight, of polyarylene ethers.

Polyarylene ethers, and also processes for their preparation, are known per se and are described, for example, in DE-A 42 19 438. Particularly suitable polyarylene ethers are polyphenylene ethers, especially those modified by polar groups. Polyphenylene ethers of this type modified by polar groups, and also processes for their preparation, are likewise known per se and are described, for example, in DE-A 41 29 499.

Preferred components C) are polyphenylene ethers modified by polar groups and built up from $c_1$) from 70 to 99.95% by weight of a polyphenylene ether, $c_2$) from 0 to 25% by weight of a vinylaromatic polymer, and $c_3$) from 0.05 to 5% by weight of at least one compound containing at least one double or triple bond and at least one functional group selected from the class consisting of carboxylic acids, carboxylic esters, carboxylic anhydrides, carboxamides, epoxides, oxazolines and urethanes.

Examples of polyphenylene ethers $c_1$) are poly-2,6-dilauryl-1,4-phenylene ether, poly-2,6-diphenyl-1,4-phenylene ether, poly-2,6-dimethoxy-1,4-phenylene ether, poly-2,6-diethoxy-1,4-phenylene ether, Poly-2-methoxy-6-ethoxy-1,4-phenylene ether, poly-2-ethyl-6-stearyloxy-1,4-phenylene ether, poly-2,6-dichloro-1,4-phenylene ether, poly-2-methyl-6-phenyl-1,4-phenylene ether, poly-2,6-dibenzyl-1,4-phenylene ether, poly-2-ethoxy-1,4-phenylene ether, poly-2-chloro-1,4-phenylene ether and poly-2,5-dibromo-1,4-phenylene ether.

Preference is given to the use of polyphenylene ethers in which the substituents are alkyl radicals having from 1 to 4 carbon atoms, for example poly-2,6-dimethyl-1,4-phenylene ether, poly-2,6-diethyl-1,4-phenylene ether, poly-2-methyl-6-ethyl-1,4-phenylene ether, poly-2-methyl-6-propyl-1,4-phenylene ether, poly-2,6-dipropyl-1,4-phenylene ether and poly-2-ethyl-6-propyl-1,4-phenylene ether.

Examples of preferred vinylaromatic polymers $c_2$) are found in the monograph by Olabisi, pp. 224–230 and 245. Merely as examples, mention may be made here of vinylaromatic polymers made from styrene, chlorostyrene, a-methylstyrene or p-methylstyrene. The structure may also involve subordinate proportions (preferably not more than 20% by weight, in particular not more than 8% by weight) of comonomers, such as (meth)acrylonitrile or (meth)acrylates. Particularly preferred vinylaromatic polymers are polystyrene and impact-modified polystyrene. Mixtures of these polymers may, of course, also be used. Preparation preferably follows the process described in EP-A 302 485.

Examples of suitable modifiers $C_3$) are maleic acid, methylmaleic acid, itaconic acid, tetrahydrophthalic acid, anhydrides and imides thereof, fumaric acid, the mono- and diesters of these acids, e.g. of $C_1$ and $C_2$ to $C_8$ alkanols, the mono- and diamides of these acids, for example N-phenylmaleimide, and maleic hydrazide. Other examples which may be mentioned are N-vinylpyrrolidone and (meth)acryloylcaprolactam.

Another group of modifiers includes, for example, the acid chloride of trimellitic anhydride, 4-(methylcarbonyloxycarbonyl)benzene-1,2-dicarboxylic anhydride, pyromellitic dianhydride, chloroethanoylsuccinaldehyde, chloroformylsuccinaldehyde, citric acid and hydroxysuccinic acid.

Particularly preferred polyphenylene ethers C) modified by polar groups in the novel molding compositions are obtained by modification with maleic acid, maleic anhydride or fumaric acid. Polyphenylene ethers of this type preferably have a molecular weight (weight-average $M_w$) of from 10,000 to 80,000, preferably from 20,000 to 60,000.

This corresponds to a reduced specific viscosity $n_{red}$ of from 0.2 to 0.9 dl/g, preferably from 0.35 to 0.8 dl/g and in particular from 0.45 to 0.6 dl/g, measured on a 1% strength by weight solution in chloroform at 25° C. in accordance with DIN 53 726.

As component D) the novel thermoplastic molding compositions may comprise from 0 to 5% by weight, preferably from 0.1 to 4% by weight, in particular from 0.3 to 2% by weight, of nucleating agent.

Examples of these are salts of carboxylic, or organic sulfonic or phosphoric acids, preferably sodium benzoate, aluminum tris(p-tert-butylbenzoate), aluminum trisbenzoate, aluminum tris(p-carboxymethylbenzoate) or aluminum triscaproate.

As component E), the novel thermoplastic molding compositions may comprise from 0 to 5% by weight, preferably from 0.1 to 4% by weight, in particular from 0.2 to 2% by weight, of antioxidants.

Antioxidants are described, for example, in "Plastics Additives and Modifiers Handbook", Ed. Jesse Edenbaum, pp. 193–200. Particular mention may be made of sterically hindered phenolic antioxidants. There are two different mechanisms by which antioxidants may intervene in the reaction of the free radicals which maintain chain growth: firstly by the donor chain-breaking mechanism, and secondly by the acceptor chain-breaking mechanism. Both types are suitable for use according to the invention.

As component F), the novel molding compositions may comprise from 0 to 5% by weight, preferably from 0.1 to 4% by weight, in particular from 0.5 to 2% by weight, of stabilizers. These stabilizers referred to here should be different from the antioxidants E). Merely as examples, mention may be made of phosphites and phosphonites, in particular tris(nonylphenyl) phosphite. Other stabilizers can also be found in "Plastics Additives and Modifier Handbook", for example on pages 282–284. Combining components E) and F) gives a synergistic system.

As component G), furthermore, the novel molding compositions may also comprise from 0 to 50% by weight, preferably from 0 to 45% by weight, in particular from 0 to 40% by weight, of fibrous or particulate fillers or mixtures of these.

Examples of these are carbon fibers, glass fibers, glass mats, glass filament rovings and glass beads, and also potassium titanate whiskers, and aramid fibers, preferably glass fibers. Glass fibers may be provided with a size and a coupling agent. These glass fibers may be incorporated either as short glass fibers or else as continuous-element strands (rovings). Preferred glass fibers comprise an aminosilane size.

Other materials which may be used as component G) are amorphous silica, magnesium carbonate, powdered quartz, mica, talc, feldspat and calcium silicates.

In addition to the components mentioned, the novel thermoplastic molding compositions may also comprise other additives. Merely as examples, mention may be made of other rubbers, thermoplastic polymers, such as polyamides, or other additives, such as flame retardants.

The total of the percentages by weight of the components used is always 100.

The novel thermoplastic molding compositions may be obtained by mixing the individual components at from 270 to 320° C. in conventional mixing apparatuses, such as kneaders, Banbury mixers or single-screw extruders, but preferably using a twin-screw extruder. To obtain a very homogeneous molding composition intensive mixing is required. The sequence of blending the components may be varied, for example two or, if desired, even more components may be premixed, but it is also possible to mix all of the components together.

The novel thermoplastic molding compositions have effective modification with good heat resistance and impact strength. They are suitable for producing fibers, films or moldings.

EXAMPLES

The following components were used:

Component A)

In a round-bottomed flask in which conditions had been rendered inert using nitrogen, 2.0 mol of styrene (208.3 g) and $2 \cdot 10^{-6}$ mol (1 mg) tetra(p-vinylphenyl)methylsilane were mixed with 3.92 ml (6 mmol) of methylaluminoxane (MAO) from Witco (1.53 M in toluene) and 0.5 ml (0.5 mmol) of diisobutylaluminum hydride DIBAH (1M in cyclohexane) from Aldrich, and heated to 60° C. The polymerization was then initiated using 5.79 mg ($2*10^{-5}$ mol) of Cp*TiCl$_3$ (pentamethylcyclopentadienyltitanium trichloride). The internal temperature was controlled to 60° C. and the polymerization was run for 2 h, then terminated by adding ethanol. The resultant polymer was washed with NaOH/ethanol and dried at 50° C. in vacuo. The molar mass distribution was determined by high-temperature GPC using 1,2,4-trichlorobenzene as solvent. Narrowly distributed polystyrene standards were used for calibration.

The star polymer produced had the following properties:

$M_w$=3,002,300

$M_w/M_n$=2.3

MVR [ml/10 min]=42.8

Alkene end groups: 241%

The melt flow rate (MVR) was determined to DIN 1133, and the alkene end groups were determined by iodine titration (Wijs titration).

Component B)

Preparation of the hydrogenation catalyst:

In a round-bottomed flask in which inert conditions had been created using nitrogen, 1125 ml of a nickel acetylacetonate solution in toluene (saturated at room temperature, about 10 g/l) were added, with stirring, to a solution of 192.5 ml of a 20% strength by weight solution of triisobutylaluminum in n-hexane. The slightly exothermic reaction evolved isobutanol, and the temperature rose to 50° C.

The slightly exothermic reaction liberated isobutanol and the temperature rose to 50° C.

Preparation of a polymer solution 1.5 kg of cyclohexane, 1.12 kg of 1,1-diphenylethylene and 57.1 ml of a 1-molar sec-butyllithium solution in n-hexane were stirred at 50° C. for 14 h in a 50 l reactor. 0.8 kg of styrene was then added at 1 kg/h, the temperature being held at 50° C. 30 minutes after the styrene addition had ended, the mixture was diluted with 22.5 kg of cyclohexane and cooled to 40° C. The resultant S/DPE copolymer block had a molecular weight $M_n$ of 9450 g/mol, and $M_w$ of 10420 g/mol, and $M_w/M_n$ of 1.10. 70 ml of tetrahydrofuran freshly titrated to the end point were added to the polymer solution. This was followed by metering in firstly 1.36 kg of butadiene at 8 kg/h and then 2.72 kg at 3 kg/h.

This polymer solution was heated in a 50 l stirred reactor to 60° C. and mixed with the freshly prepared catalyst suspension, followed by hydrogenation at 120° C. and 18 bar, using hydrogen. The residual double-bond content determined after 25 h was 4.1%. After a further 17.5 h the solution was cooled to 60° C. The double-bond content was 2.6%.

The reaction solution was then subjected to oxidative treatment with 300 ml of a mixture of 3.6 l of water, 360 ml of a 30% strength hydrogen peroxide solution and 200 ml of 98% strength acetic acid at 60° C., and the residue was washed with water and dried.

Component C)

A modified polyphenylene ether prepared at 300° C. in a twin-screw extruder by reacting c$_1$) 99% by weight of poly-2,6-dimethyl-1,4-phenylene ether with $n_{red}$=0.48 dl/g (determined on a 1% strength by weight solution in chloroform at 25° C.) with c$_3$) 1% by weight of fumaric acid.

The melt was degassed, extruded through a water bath and pelletized.

Component D)

Aluminum trisbenzoate

Component E)

Phenol sterically hindered using tert-butyl groups (Irganox® 3052 from Ciba Geigy)

Component F)

Tris(nonylphenyl) phosphite from Ciba Geigy

Component G)

Glass fibers of length 4.5 mm and L/D ratio of 450 with an aminosilane size (PPG 3544 from PPG)

Examples 1 to 5: Preparation of the thermoplastic molding compositions

The components given in the table were compounded in a twin-screw extruder (Werner & Pfleiderer ZSK 30) at 290° C. The polymer melt was extruded, cooled in a water bath and pelletized.

Comparative Examples C1 to C4:

The procedure of examples 1 to 5 was followed, except that component B) was an ethylene-butylene-styrene block copolymer with $M_w$ of about 180,000 g/mol (Kraton® G 1651 from Shell).

(Charpy) impact strength was determined to ISO 179/1eU, and heat distortion temperature (HDT A) to ISO 75-2.

The compositions and properties of the thermoplastic molding compositions are given in the table.

| Example | Components (% by wt.) | | | | | | | | Impact strength [kJ/m²] | Heat distortion temperature [° C.] |
| | A) | B) | C) | D) | E) | F) | G) | Kraton | | |
|---|---|---|---|---|---|---|---|---|---|---|
| 1 | 80 | 15 | 3.3 | 0.6 | 0.3 | 0.8 | — | — | 42.2 | — |
| 2 | 85 | 10 | 3.3 | 0.6 | 0.3 | 0.8 | — | — | 39.7 | — |
| 3 | 90 | 5 | 3.3 | 0.6 | 0.3 | 0.8 | — | — | 22.3 | — |
| 4 | 50 | 15 | 3.3 | 0.6 | 0.3 | 0.8 | 30 | — | 67.1 | 245 |
| 5 | 55 | 10 | 3.3 | 0.6 | 0.3 | 0.8 | 30 | — | 57.0 | >250 |
| C1 | 80 | — | 3.3 | 0.6 | 0.3 | 0.8 | — | 15 | 27.2 | — |
| C2 | 85 | — | 3.3 | 0.6 | 0.3 | 0.8 | — | 10 | 21.9 | — |
| C3 | 90 | — | 3.3 | 0.6 | 0.3 | 0.8 | — | 5 | 14.2 | — |
| C4 | 50 | — | 3.3 | 0.6 | 0.3 | 0.8 | 30 | 15 | 55.2 | 239 |

We claim:

1. A thermoplastic molding composition comprising

| | |
|---|---|
| A) from 20 to 96% | by weight of star polymers obtained by polymerizing vinylaromatic monomers with a branching monomer which contains at least two vinylaromatic groups and which has been prepared in the presence of a catalyst comprising, as active constituents, a transition metal complex of the 2nd to 8th transition group of the Periodic table and a metallocene-ion-forming compound, |
| B) from 3 to 50% | by weight of copolymers comprising vinylaromatic monomers, 1,1-diphenylethylene and, if desired, dienes, |
| C) from 1 to 15% | by weight of polyarylene ethers, |
| D) from 0 to 5% | by weight of nucleating agents |
| E) from 0 to 5% | by weight of antioxidants |
| F) from 0 to 5% | by weight of stabilizers, and |
| G) from 0 to 50% | by weight of fibrous or particulate fillers | the total of the percentages by weight being 100%.

2. The thermoplastic molding composition defined in claim 1, which comprises from 40 to 92% by weight of component A),
from 4 to 30% by weight of component B),
from 2.5 to 5% by weight of component C),
from 0.3 to 2% by weight of component D),
from 0.2 to 2% by weight of component E),
from 0.5 to 2% by weight of component F), and
from 0 to 40% by weight of component G).

3. The thermoplastic molding composition defined in claim 1, wherein component A) comprises, as branching monomer, a compound of formula (I):

$$[R^a]_p\text{—}M\text{—}\left[(CH_2)_m\text{—}\underset{R^c}{\underset{|}{\bigcirc}}\text{—}CR^b\text{=}CH_2\right]_n \quad (I)$$

where:

$R^a$ is selected from the group consisting of hydrogen, halogen and an inert organic radical having up to 20 carbon atoms, and if $p \geq 2$ the radicals $R^a$ can be identical or different, and two radicals $R^a$ can, together with the metal atom bonded thereto, form a from 3- to 8-membered ring, and $R^a$ can moreover be a conventional complex ligand, if M is a transition metal, $R^b$ is selected from the group consisting of hydrogen, $C_1$–$C_4$-alkyl and phenyl;

$R^c$ is selected from the group consisting of hydrogen, $C_1$–$C_4$-alkyl, phenyl, chlorine and an unsaturated hydrocarbon radical having from 2 to 6 carbon atoms, M is selected from the group consisting of C, Si, Ge, Sn, B, Al, Ga, N, P, Sb, Ti, Zr, Hf, V, Nb, Ta, Cr, Mo, W, Mn, Fe, Ru, Os, Co, Rh, Ir, Ni, Pd, Pt, Cu, Zn and Cd, n is from 2 to 6, m is from 0 to 20, and p is from 0 to 4, with the proviso that the total of n and p equals the valency of M.

4. The thermoplastic molding composition defined in claim 1, wherein component B) is prepared by anionic polymerization.

5. The thermoplastic molding composition defined in claim 1, wherein Component B) is a hydrogenated 3-block copolymer.

6. The thermoplastic molding composition defined in claim 1, wherein Componetn C) is a polyphenylene ether modified with polar groups.

7. A process for preparing the thermoplastic molding composition as defined in claim 1, which comprises the step of mixing the components A) to G) at a temperature of from 270 to 320°.

8. A fiber, a film or a molding obtained from the thermoplastic molding composition defined in claim 1.

9. The thermoplastic molding composition defined in claim 1, wherein said catalyst for the preparation of component A further comprises an aluminum compound.

10. The thermoplastic molding composition defined in claim 3, where component B) is prepared by anionic polymerization.

11. The thermoplastic molding composition defined in claim 3, wherein component B) is a hydrogenated 3-block copolymer.

12. A thermoplastic molding composition as claimed in claim 3, wherein component C) is a polyphenylene ether modified with polar groups.

13. A process for preparing the thermoplastic molding composition defined in claim 3, which comprises the step of mixing the components A) to G) at a temperature of from 270 to 320° C.

14. A fiber, a film or a molding obtained from the thermoplastic molding composition defined in claim 3.

15. The thermoplastic molding composition defined in claim 3, wherein said catalyst for the preparation of component A) further comprises an aluminum compound.

* * * * *